United States Patent [19]
West

[11] Patent Number: 4,656,575
[45] Date of Patent: Apr. 7, 1987

[54] SINGLE PHASE TO THREE PHASE DYNAMOELECTRIC CONVERTER

[76] Inventor: Reed West, 3026 Quail Rd., Escondido, Calif. 92026

[21] Appl. No.: 853,652

[22] Filed: Apr. 18, 1986

[51] Int. Cl.⁴ .............................................. H02M 5/32
[52] U.S. Cl. ..................................... 363/150; 323/204
[58] Field of Search ................... 310/161; 322/95, 96; 323/201, 204; 318/768, 769; 363/150

[56] References Cited

U.S. PATENT DOCUMENTS

| | | | |
|---|---|---|---|
| 2,593,987 | 4/1952 | Courtney et al. | 318/768 |
| 2,832,925 | 4/1958 | Koll et al. | 363/156 |
| 2,922,942 | 1/1960 | Steelman | 318/768 |
| 3,122,693 | 2/1964 | Hermansdorfer | 318/768 |
| 3,271,646 | 9/1966 | Lewus | 363/153 |
| 3,387,202 | 6/1968 | Buffington | 363/150 |
| 3,566,226 | 2/1971 | Tamm | 318/768 |
| 3,670,238 | 6/1972 | Ronk | 363/150 |
| 3,673,480 | 6/1972 | Johnstone | 318/768 |
| 3,809,980 | 5/1974 | Nottingham | 363/154 |
| 4,079,446 | 3/1978 | Hertz | 363/150 |
| 4,249,237 | 2/1981 | Ronk et al. | 363/150 |
| 4,484,125 | 11/1984 | Hertz | 318/768 |
| 4,513,237 | 4/1985 | Ford | 318/768 |

Primary Examiner—Patrick R. Salce
Assistant Examiner—Jeffrey Sterrett
Attorney, Agent, or Firm—John J. Murphey

[57] ABSTRACT

Single phase to three phase dynamoelectric converter for generating three-phase current from a single-phase input comprising a three-phase electric motor generator having first, second and third Y-wound stator windings, a bank of run capacitors connected between the first powered stator winding and the third unpowered stator winding, a normally closed potential-type relay with its winding connected between the second and third stator windings, a normally open slave relay with its winding connected between the first stator winding and the potential relay winding through the set of normally closed potential relay contacts, and a bank of starter capacitors connected between the third stator winding and one of the slave relay open contacts adapted to provide phase shifted starting power to the third stator winding when the single phase energy is applied and disconnect from the third stator winding to allow the converter to run and produce balanced three-phase power that can be drawn from all three stator windings for use to start and drive externally located three-phase motors.

7 Claims, 2 Drawing Figures

SINGLE PHASE TO THREE PHASE DYNAMOELECTRIC CONVERTER

BACKGROUND OF THE INVENTION

1. Field of the Invention

This invention pertains to the field of electric power delivery systems. More particularly, this invention concerns polyfield driven devices and more specifically to devices to convert single-phase alternating current to three-phase alternating current.

2. Description of the Prior Art

Three-phase electric motors are generally considered creatures of heavy industry necessitating three separate electrical input phases in the form of heavy power lines. Single-phase electric motors are generally found in light industry and most commercial activity, for example, dry cleaning shops and auto repair stations and the like, where single-phase electric power may be brought in by lighter gauge power lines. While historically three-phase electric motors are more powerful, on a pound-for-pound basis, than their single-phase counterparts, modern technology has made them even more desirable with the advent of lighter gauge construction and higher torque output. A problem remains, however, in that the cost of installing three-phase electrical power lines into a business served by existing single-phase is so costly that it far outweighs the benefits of three-phase motors.

In the three-phase electric motor, there are three separate field or stator windings equally spaced about the centerline of the rotor and connected at the center to form the Y-wind. In three-phase power, the phase angles between the alternating current in each winding is equally spaced apart from that of the neighbor winding by 120°; this provides maximum torque to the motor at start and provides balanced power during running. Should single-phase power be connected to two of the windings of a three-phase motor, there would be no power developed in the third winding and the motor would either not run at all or run so slowly that heat build-up would eventually burn the windings. However, three-phase motors are very efficient and deliver more power per watt than single-phase motors so that, whenever it is economically feasible to create a third phase, the use of three-phase motors becomes exceedingly desirable.

The prior art has recognized that single-phase power can be split into three, phase-differentiated phase angled currents to effectively power three-phase motors. This operation makes three-phase motors useful in light industrial applications. Devices that develop three-phase alternating current from a single-phase source are of two general types: The static phase converter, a device comprising transformers and other related electronic components, see U.S. Pat. No. 2,832,925, and the rotary phase converter, a device comprising an induction motor powered by single-phase and producing three-phase current, see U.S. Pat. Nos. 2,593,987; 2,922,942; 3,122,693; 3,271,646; 3,387,202; 3,566,226; 3,670,238; 3,673,480; 3,809,980; 4,079,446; 4,249,237; and, 4,484,125. This invention concerns the latter type.

The prior art rotary phase converter generally comprises a three-phase induction motor where a single-phase of 240 volts is connected across the ends of two of the Y-windings leaving the third winding unpowered. The third winding is usually connected to one of the powered windings through a plurality of capacitors that shift the phase angle of the third winding into a three-phase balance. The three-phase motors or loads used in the industrial application are then connected in parallel with this "converter" motor. They draw most of their power from the single phase current fed to them and the converter motor from commercial power lines. The third phase is properly phase-shifted by the converter motor to balance out their operation. The converter motor runs under no external load, its sole function is to generate a third phase from a single phase.

In this type of converter, the motor must be started and brought up to speed from the single-phase input current. Since one phase does not provide a proper phase angle in the third winding, the motor starts slowly, if at all, gathers speed very slowly and generally runs sluggishly and overheats. The prior art has discovered that by connecting a large bank of capacitors from one powered winding to the third unpowered winding, sufficient phase shifting could be generated in the third winding, along with the increased voltage provided by capacitors in an alternating current system, to "kick" over the third winding and cause faster starting.

The problem has not been with the use of capacitors but with the amount of capacitance in the capacitors. Large capacitors such as electrolytic capacitors provide good starting power, but, due to their construction, cannot remain in the circuit for more than a few seconds less they overheat and disintegrate. Oil-filled metal film capacitors, on the other hand, provide good long term power for running but usually are insufficient in Farad capacity to provide good starting power. The prior art has therefore just used large quantities of oil-filled metal film capacitors to start and run the three-phase converter motor. While a large enough number of these capacitors will start the motor, they contain too much capacitance to remain in the circuit during motor running. The phase angle is over-shifted in the third winding resulting in poor running characteristics, undesirable heat build-up and the voltage build-up in the third winding is too great for economical running. The prior art has sought to solve this problem using a plurality of electronic devices involving complicated circuitry, see the United States Patents cited, supra.

This invention solves the aforesaid problems and provides a quick-starting converter motor that runs economically and without heat build-up; it uses much less power than the prior art devices and far less complicated circuitry. The invention comprises the utilization of a bank of electrolytic capacitors to provide starting power and a switching circuit to switch them out of use during converter motor running. The oil-filled metal film capacitors are only used in running the motor and thus can be sized to provide proper phase angle at running speed without producing problems during starting. The two sets of capacitors are separated to different powered windings so that they do not over shift any phase angle in any of the windings. The overall unit of this invention is small, compact and provides three-phase alternating current to start three-phase phase units connected in parallel thereto of the same gross horsepower if started simultaneously and will support motors having twice the amount of converter motor rated horsepower if started consecutively. The converter of this invention uses only two relays in addition to the starting capacitors and the runing capacitors thus eliminating the need for expensive transformers, resistors, diodes and transistors.

SUMMARY OF THE INVENTION

The main object of this invention is a small, compact single-phase rotary phase converter that provides an economical means of producing three-phase alternating current to power three-phase motors and other loads connected in parallel therewith. Other objects of this invention include a rotary phase converter having improved starting power, improved running power with balanced phases and a converter containing simplified circuitry. A further object of this invention is a device having few moving parts to provide extended life and ease in maintenance and repair. These and other objects of the invention will become more apparent upon reading the following Description of the Preferred Embodiment taken together with the drawings appended hereto. The scope of protection desired by the inventor may be gleaned from a fair reading of the Claims that conclude this specification.

DESCRIPTION OF THE PREFERRED EMBODIMENT

Figure 1:
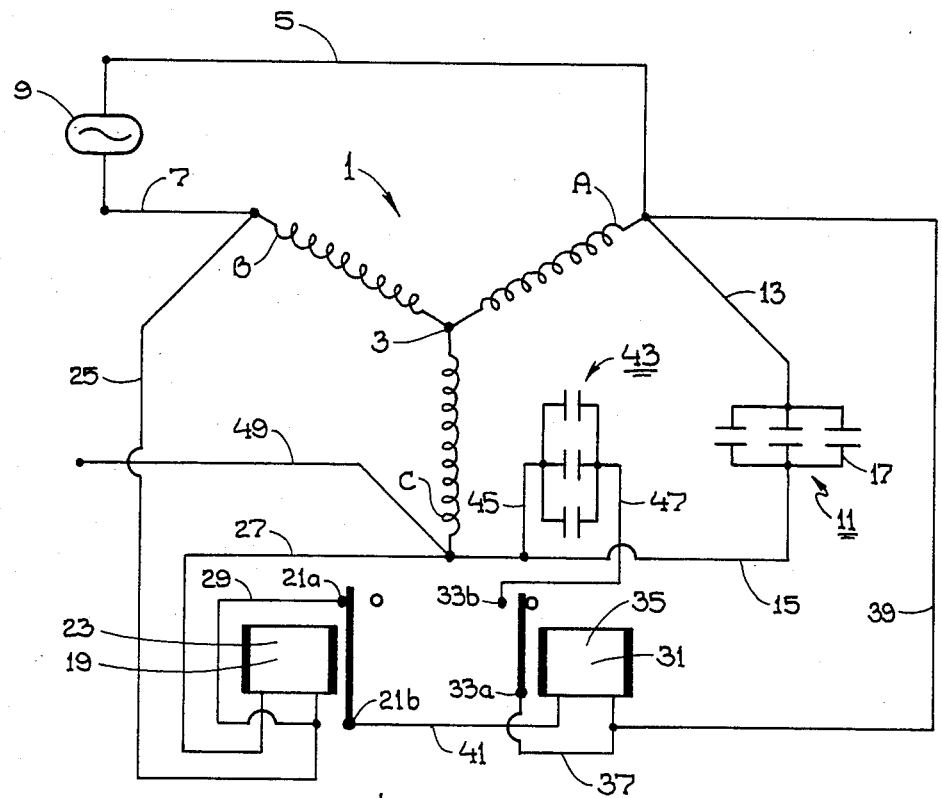
FIG. 1 is a circuit diagram of the preferred embodiment of this invention.

In FIG. 1 is shown the preferred embodiment of circuitry of this invention comprising a three-phase, Y-wound induction motor-stator or motor/generator, shown generally at 1, having first, second and third separate stator windings A, B, and C respectively. Said windings are attached at a common centerpoint 3 to result in the Y-winding configuration. For convenience of illustration, the free ends of windings A, B and C will be referred to by these letters. The rotor is not shown as it runs under no load and takes no part in powering any of the three-phase motors. Windings A and B are connected by conductors 5 and 7 to a suitable source of single-phase, 240 volt power shown generally at 9.

As shown, said single phase of 240 volt alternating current is applied across stator windings A and B so that the measured voltage between A and center tap 3 would be 120 volts as would the measured voltage between B and center tap 3.

Run capacitor means 11 is shown in FIG. 1 to be connected between powered stator winding A and unpowered stator winding C by conductors 13 and 15. Said means 11 comprises a series of oil-filled, metal film capacitors 17 mutually connected in parallel. The total capacitance of said running capacitors 7 follows the general formula of 30 microfarads per rated horsepower of motor/generator 1, for motor/generators having a rating of up to 10 horsepower and 20 microfarads per rated horsepower for motor/generators having a rating above 10 horsepower. The function of said capacitor means 11 is to shift the phase angle of the alternating current impressed upon winding C to an angle between that of windings A and B.

A potential relay 19 is provided comprising a set of normally closed contacts 21a and 21b and a winding 23 to open them. Relay winding 23 is connected in parallel between stator windings B and C by conductors 25 and 27. One side of winding 23 is connected to relay contact 21a by conductor 29. Potential relay 19 is of a type that remains closed at voltages less than 260 volts; at and above 260 volts said relay opens and remains open under voltages ranging from 260 and above to down to approximately 100 volts. Below that 100 volts, said relay closes again.

A slave relay 31 is provided comprising a set of normally open contacts 33a and 33b and a winding 35 to close them. One side of relay winding 35 is connected by conductor 37 to slave relay contact 33a and to powered stator winding A by conductor 39. The other side of relay winding 35 is connected by connector 41 to potential relay contact 21b. Slave relay 31 is a single-pole, single-throw, normally open 200 volt relay.

Start capacitor means 43 is connected in series between said third unpowered winding C and the other open slave relay contact 33b by conductors 45 and 47. Start capacitor mean 43 is shown to comprise a plurality of electrolytic-type starting capacitors connected in mutual parallel. The total capacitance of starting capacitor means 43 follows the general formula of 65 microfarads per rated horsepower in motor/generator 1. There may be some variance depending upon the specific motor, however those skilled in the art would be able to perceive the need for such alteration and provide for same.

The inventive three-phase converter, described above, operates as follows: Prior to application of single-phase power to conductors 5 and 7, normally closed contacts 21a and 21b of potential relay 19 connect winding 35 of normally open slave relay 31 in parallel between powered stator winding B and unpowered stator winding C. Starting capacitor means 43 is therefore insolated from any power source. Upon application of single-phase alternating current 9 to conductors 5 and 7, a voltage of approximately 240 volts is developed across stator windings B and C. This voltage passes through potential relay winding 23 and through relay contacts 21a and 21b to slave relay winding 35. Slave relay winding 35 is immediately energized to close normally open contacts 33a and 33b. This closure energizes start capacitor means 43 from powered stator winding A through conductor 39. Start capacitor means 43 accordingly energizes stator winding C and shifts the phase of power brought in from powered stator winding A to cause a three-phase alternating current to exist in all three stator windings A, B and C. This three-phase alternating current provides quick starting to the rotor of motor/generator 1.

Commensurate with the introduction of phase shifted alternating current to winding C, start capacitor means 43 raises the voltage in winding C beyond 240 volts. When said voltage reaches 260 volts (usually within a few seconds after energizing windings A and B) potential relay winding 23 senses the voltage value and actuates relay 19 to open contacts 21a and 21b. Immediately, slave relay winding 35 is de-energized and contacts 33a and 33b disconnect into their normally open position. Simultaneously, start capacitor means 43 is deenergized and drops out of the electrical circuit. Run capacitor means 11, is constantly powered from stator winding A and delivers phase-shifted power to stator winding C for continuous running. There is thus generated a balanced three-phase alternating current in stator windings A, B and C and the third phase is brought out from stator winding C by conductor 49.

Figure 2:
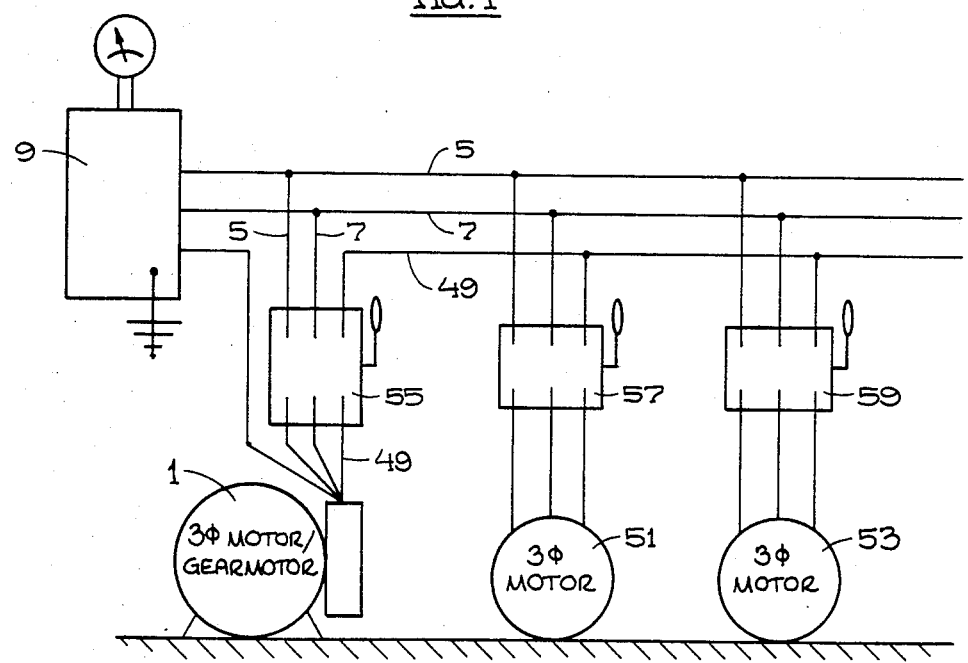
FIG. 2 is a general diagram showing how the phase converter of this invention is connected between the single-phase power source and the three-phase motors connected thereto.

As shown in FIG. 2, motor generator 1 is connected to input single-phase power source 9 so that conductors 5 and 7 impress a single-phase alternating current to two of the stator windings. The third stator winding emanates via conductor 49 and proceeds along with conductors 5 and 7 to connect with three-phase motors 51 and 53 as shown. Motor disconnect boxes 55, 57, and 59 are provided between the respective three-phase lines for starting and stopping the motors as is known in the art.

What is claimed is:

1. A single phase to three-phase dynamoelectric converter for starting and running a plurality of three-phase motors or like three-phase operating loads from a single-phase power supply, said converter comprising:

(a) a three-phase electric motor/generator comprising first, second and third Y-wound stator windings adapted to have said first and second windings connected to a suitable source of single-phase power;

(b) run capacitor means connected between said first powered stator winding and said third unpowered stator winding to develop a voltage in said third winding at a phase angle different from the phase angles in said first and second powered windings;

(c) a potential-type relay comprising a set of normally closed contacts and a winding to open them, said winding connected between said second and third stator windings;

(d) a slave relay comprising a set of normally open contacts and a winding to close them, said slave relay winding connected between said first stator winding and said potential relay winding through said set of normally closed potential relay contacts; and, (e) start capacitor means, connected between said third, unpowered stator winding and one of said slave relay open contacts, adapted to provide immediate capacitor-phase shifted starting power to said third stator winding when said slave relay contacts close upon said slave relay winding becoming energized by the initial voltage increase developed between said second and third stator windings when external single-phase power is applied thereto, and wherein said slave relay contacts are adapted to open and disconnect said starting capacitor means when the voltage developed between said second and third stator windings reach a level sufficient to energize said potential relay windings to open said relay contacts, to allow said motor/generator to run under balanced power and produce balanced three-phase power to be drawn from all three stator windings for use in driving external three-phase motors.

2. The converter device of claim 1 wherein said run capacitor means comprises a plurality of oil-filled capacitors mutually connected in parallel.

3. The converter device of claim 2 wherein said capacitors contain a total capacitance according to the formula of about 30 microfarads per rated horsepower of said motor/generator up to 10 rated horsepower and about 20 microfarads per rated horsepower of said motor/generator above said horsepower.

4. The converter device of claim 1 wherein said potential-type relay remains closed between voltages, impressed across said relay winding, below about 260 volts and thereafter open and remain open at voltages between about 100 volts and higher.

5. The converter device of claim 1 wherein said slave relay is a single-pole, single-throw 220 volt relay.

6. The converter device of claim 1 wherein said start capacitor means comprises a plurality of electrolytic-type capacitors mutually connected in parallel.

7. The converter device of claim 6 wherein the total capacitance of said capacitors follows the formula of about 65 microfarads per rated horsepower of said motor/generator.

* * * * *